Aug. 14, 1951 A. M. KRATTEBOL ET AL 2,563,942
METHOD AND APPARATUS FOR TREATING STARCHES
Filed May 9 1947 4 Sheets-Sheet 2
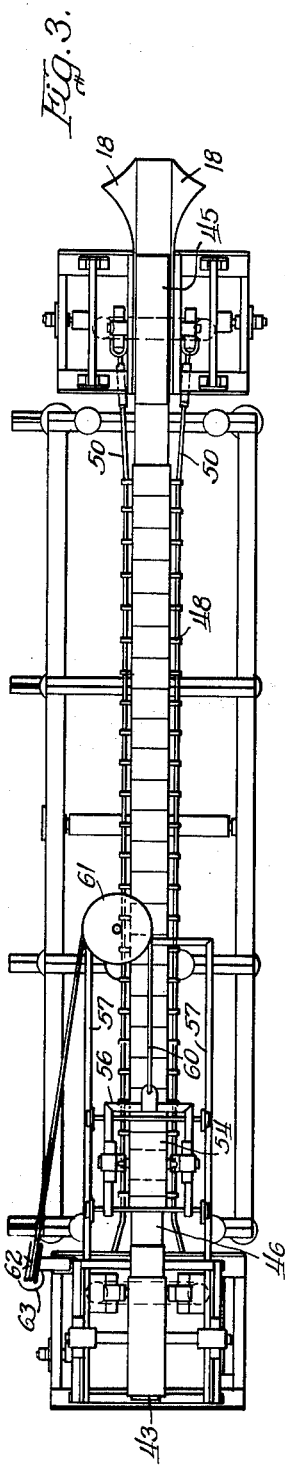
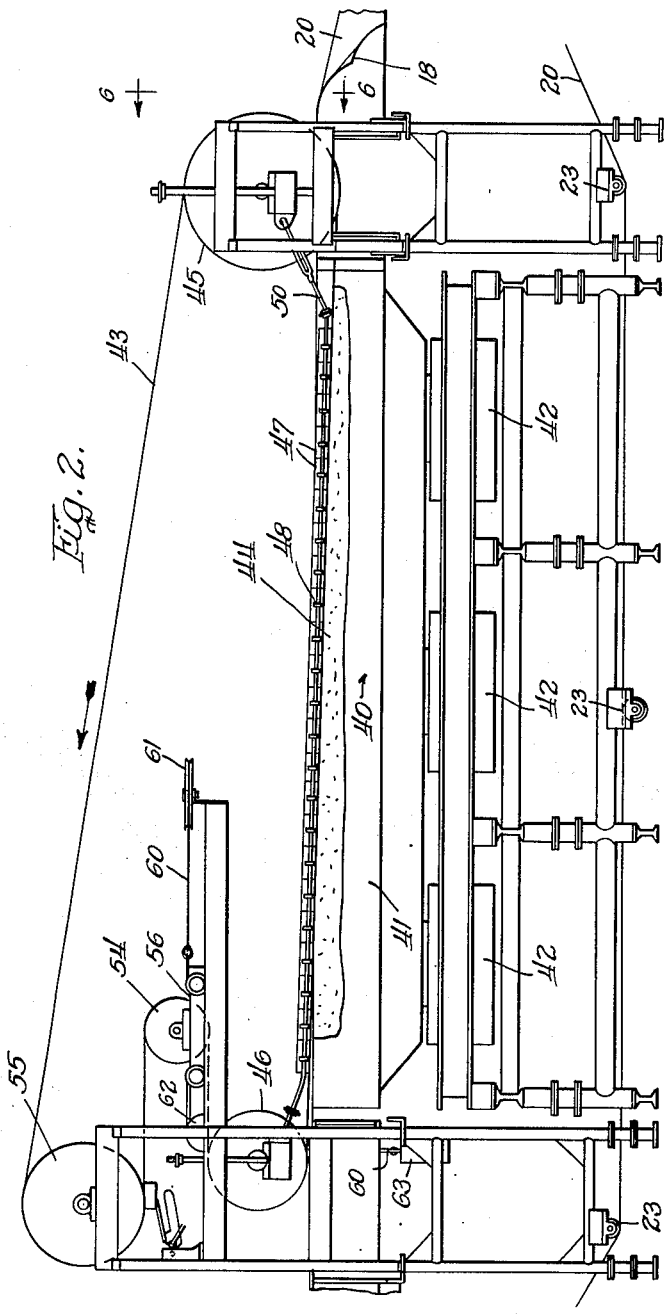
Inventors:
Alf Marshall Krattebol,
Alfred Cooke.
By Mildred Oncken
Agent

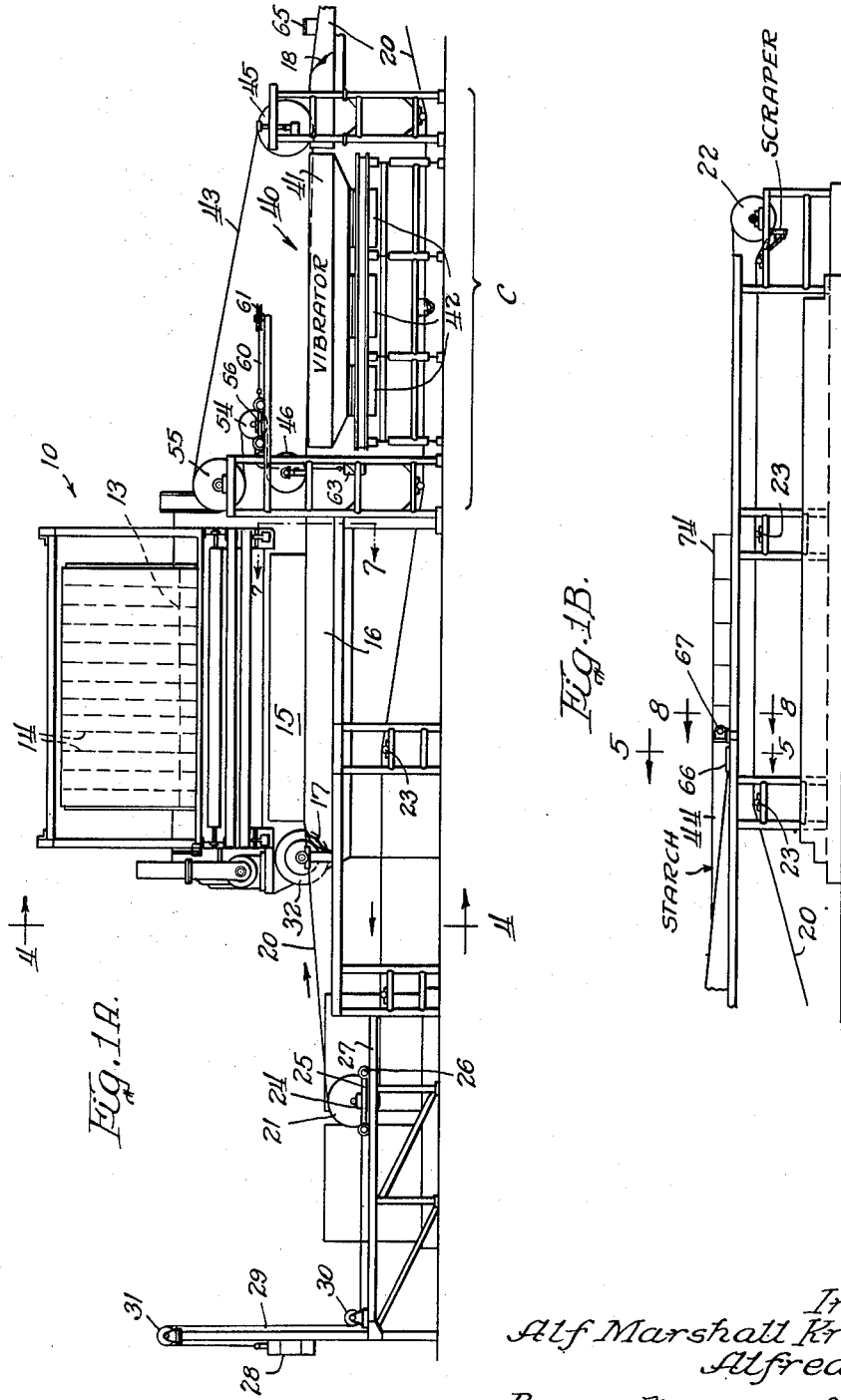

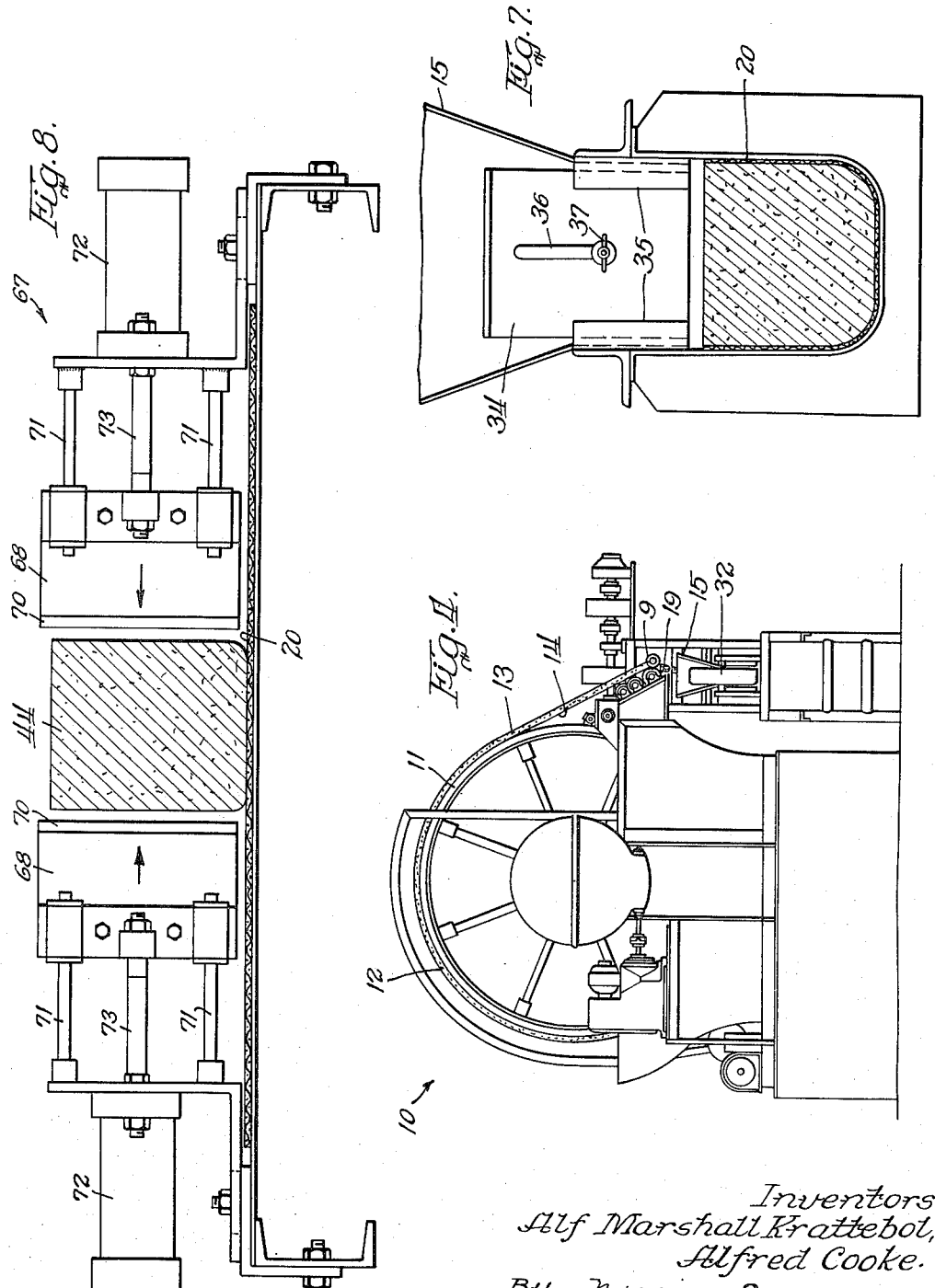

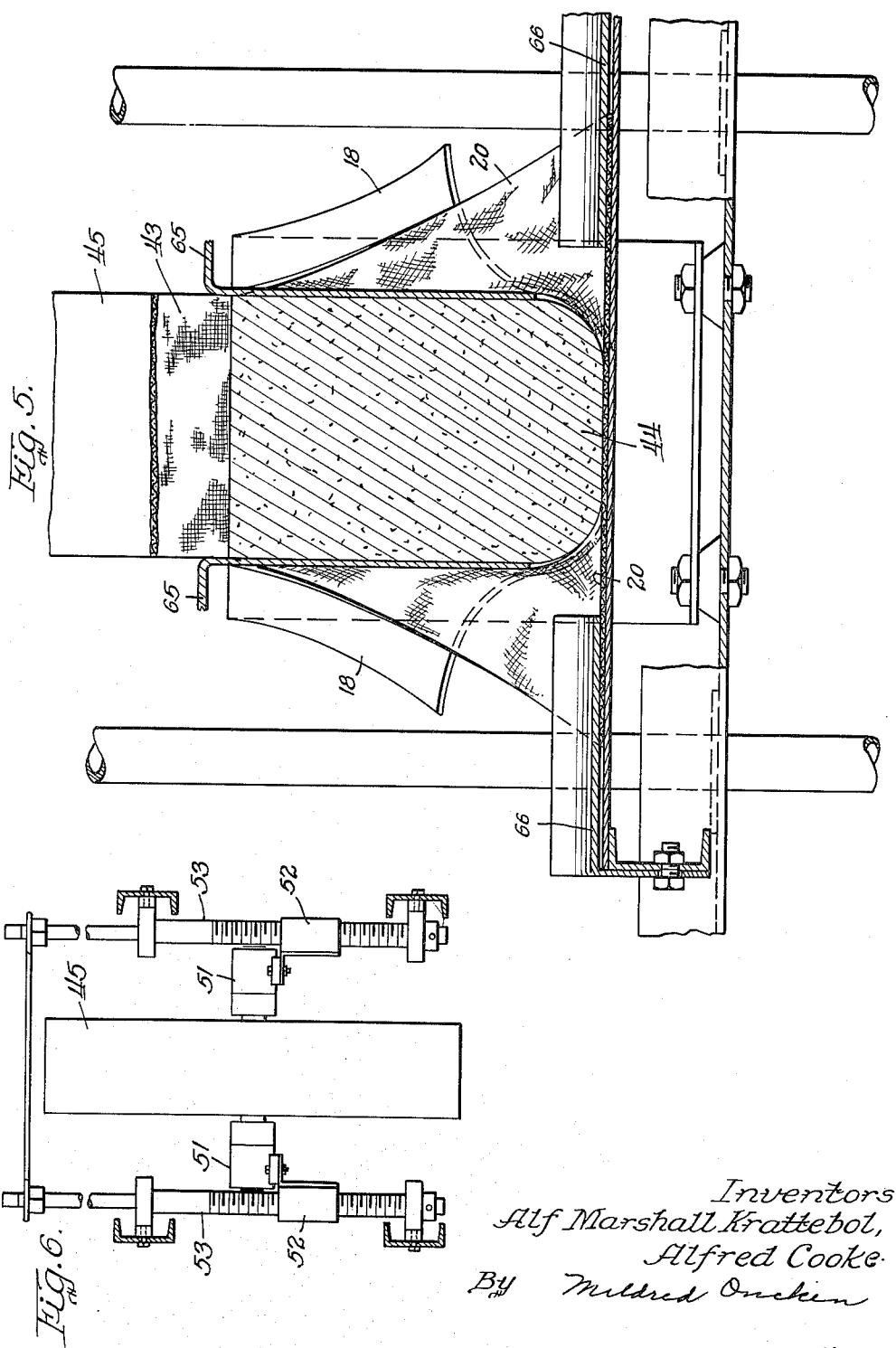

Patented Aug. 14, 1951

2,563,942

UNITED STATES PATENT OFFICE 2,563,942

METHOD AND APPARATUS FOR TREATING STARCH

Alf Marshall Krattebol, Chicago, and Alfred Cooke, Clarendon Hills, Ill., assignors to Corn Products Refining Company, New York, N. Y., a corporation of New Jersey Application May 9, 1947, Serial No. 746,976

14 Claims. (Cl. 127—23)

1

The present invention relates, generally, to a continuous process of converting starch slurry into blocks or cakes of starch suitable for drying to form "crystal starch," and to apparatus for carrying out such a continuous process.

The conventional process of producing crystal starch is, briefly, as follows:

A slurry of starch in water having a density of about 15° to 25° Baumé is poured into a number of drip boxes, which are arranged in rows. These boxes are well known in the starch industry and are usually in the form of wooden troughs about five feet in length, having a width of about eight inches and a depth of about ten inches. The bottom of each box is foraminous with the perforations being about one-half inch in diameter. Previous to being filled with starch slurry, the interior of each drip box is loosely lined with filter cloth.

Part of the water in the starch slurry filters by gravity through the filter cloth and runs out onto drains. The starch settles in the bottom of the box and excess water on top is removed by tipping the box. During the tipping operation some starch is lost. After a suitable length of time, during which each drip box is refilled with starch slurry, tipped and jolted or shaken manually several times, the starch in the drip box coalesces into a block conforming to the shape of the interior of the drip box. The jolting serves to establish channels in the settled starch thereby promoting more rapid drainage therethrough. The total time required for forming such a block of coalesced corn starch, including the filling and filtering times, may be from eight to sixteen hours.

After the blocks of starch have been thus formed in the drip boxes, they are removed, broken into pieces of convenient size and then transferred to kilns to be dried, according to known methods. During the drying operation, the starch crystals form.

Obviously, the foregoing conventional procedure of forming blocks of starch suitable for drying into crystal starch, has many objectionable features. A great amount of hand labor is required in the procedure. Quantity production makes it necessary to devote a very large floor space to the procedure. Care must be taken to maintain cleanliness and to prevent fermentation and mold growth. The moisture content of the starch blocks is not uniform.

The need for an improved procedure has long been recognized and to this end several processes have been proposed, such as, forming blocks of starch by means of filter presses, centrifuges or hydraulic pressure molding devices. However, these proposed processes are not regarded as satisfactory.

The object of the present invention, generally

2 stated, is the provision of a continuous type of process wherein starch slurry may be processed into blocks or cakes of starch suitable for drying to form crystal starch, and to the provision of apparatus suitable for carrying out such continuous process.

More specifically, an important object of the invention is the provision of a continuous process, and machine for effecting the same, whereby starch filter cake formed by filtering starch slurry on a continuous type of filter may be formed into a continuous block of coalesced starch having uniform moisture content, suitable for drying into crystal starch.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Figure 1a is a side elevational view of the major portion of an apparatus for carrying out the continuous process of this invention, including the head end of the apparatus;

Figure 1b is a side elevational view of the remainder of the apparatus not shown in Figure 1a, and including the tail end of the apparatus;

Figure 2 is an enlarged, fragmentary, side, elevational view of that portion of the apparatus shown in Figure 1a which is included within the bracket C on Figure 1a;

Figure 3 is a top plan view, with belt removed, of the portion of the apparatus shown in Figure 2;

Figure 4 is an elevational view taken on line 4—4 of Figure 1a showing primarily a continuous drum type of filter forming a part of the apparatus;

Figure 5 is a fragmentary, enlarged, sectional view taken on line 5—5 of Figure 1b and including therein certain parts shown on the extreme right end of Figure 1a;

Figure 6 is an enlarged, elevational view taken on line 6—6 of Figure 2;

Figure 7 is an enlarged, fragmentary sectional view taken on line 7—7 of Figure 1a; and Figure 8 is an enlarged sectional view taken on line 8—8 of Figure 1b showing a device for cutting or scoring a block of starch.

Briefly, the process of the present invention resides in: continuously filtering a slurry of starch so as to form a filter cake having a moisture content in the neighborhood of 45 percent; discharging the broken filter cake into a moving U-shaped conveyor belt so as to form a continuous moving mass of filter cake; and, coalescing the starch mass into a continuous block or form of predetermined cross-section by subjecting it to a period of vibration.

Referring now particularly to Figures 1a and 4 of the drawings, the reference numeral 10 indicates, generally, a continuous drum type of filter of the type commonly known as a Feinc filter, with a string discharge. The filter 10 is a known piece of equipment in the starch industry and a detailed description of it is not necessary. It will be understood that other commercial filters of the continuous type may also be used. As the drum 11 of the filter rotates in a clockwise direction, as indicated by the arrow on Figure 4, a deposit or layer of starch 12 is built up on its surface. The bottom portion of the drum 11 rotates in a pool of the starch slurry and the starch is caused to adhere to the outer surface of the drum 11 by application of vacuum, all as is well known.

The filter cake of starch 12 is lead off from the drum 11 along the line designated at 13 in Figures 1a and 4. It is along the line 13 that the strings 14, spaced apart approximately five-eighths of an inch, separate from the surface of the drum 11 thereby pulling way the filter cake 12. The filter cake 12 breaks off the strings 14 where they pass around the roll 19 of small radius and the broken pieces of the filter cake fall into a discharge hopper 15 which extends along the front of the filter 10. It may be desirable to break the pieces of filter cake into smaller pieces and this may be done by inserting a scoring roll 9 adjacent and parallel to roll 19. Roll 9 scores the filter cake as it passes over roll 19 so that when the cake drops into hopper 15, the cake breaks at the scorings. The filter cake may also be broken into small pieces by inserting in the hopper 15 a frame (not shown) which is provided with cross wires spaced apart a desired distance. If desired, both devices may be used in combination.

The filter 10 is operated so as to produce a filter cake having a predetermined moisture content depending primarily upon the particular kind of starch being handled, and the temperature of the starch undergoing treatment. The starch slurry is heated in order to facilitate filtration thereof, but the temperature should not at any time exceed the gelatinization temperature of the starch. Generally speaking, the higher the temperature of the starch, the lower will be the amount of moisture required for the starch filter cake to satisfactorily "puddle" or coalesce into a block which may be dried into crystal starch. The following table sets forth percentage moisture contents for various types of starches, either in the native or modified form, for operating in accordance with the process, and in the apparatus, of the present invention:

| Starch | Minimal Moisture Content in Per Cent for Temps. of 100–110° F. | Maximal Moisture Content in Per Cent for Temps. of 70–110° F. |
| --- | --- | --- |
| Corn | 44 | 47 |
| Potato | 48 | 53 |
| Rice | 50 | 55 |
| Sorghum | 44 | 47 |
| Tapioca | 45 | 52 |
| Wheat | 42 | 49 |

As indicated above, the starch slurry is heated to facilitate filtration thereof. However, the temperature of the starch undergoing vibration may vary from room temperature or lower up to the temperature at which starch gelatinizes. In ordinary commercial operations, the temperature of the starch filter cake to be subjected to vibration will usually be within the range of 70° F. to 110° F. If the temperature of the starch being filtered is below 70° F., and consequently that of the filter cake also, slightly higher moisture contents than those indicated in the table, i. e., of the order of about one-half to three-fourths percent, are required.

The starch slurry supplied to the filter 10 should have a density of approximately 25° Baumé or less at 60° F. Slurries having densities greater than 25° Baumé are difficult to transfer from one vessel to another by pumping. Preferably, the density is kept well up toward this particular figure in order to reduce the amount of filtration required. Thus second wash starch filter cake obtained in the commercial wet milling of corn may be made up into a slurry having a density of about 22° Baumé. Other types of starch slurries may be similarly prepared. These slurries may be subjected to modification treatment below the gelatinization temperature of starch with acid, such as sulfuric, nitric and the like, in accordance with known methods and thereafter handled in the same manner as slurries of native starch, insofar as the process of the present invention is concerned. The expressions "starch slurry" and "starch filter cake" as used herein and in the appended claims are intended to designate a slurry and filter cake of either native or modified starch.

The hopper 15 into which the filter cake is discharged is mounted directly over the front portion of a rigid U-shaped metal trough 16, the entry of which is outwardly flared as indicated at 17 in Figure 1a and the outlet of which is similarly flared as indicated at 18. It will be understood that the trough 16 may be formed in a single section or in connected sections. The trough 16 serves to shape an endless conveyor belt 20 into a U-shaped conveyor along its upper run. At the front end of the apparatus, the belt 20 runs over a smooth, cylindrical idling pulley 21, while at the opposite or tail end of the apparatus, it runs over a driving pulley 22 (Figure 1b). The belt 20 may be formed of canvas or similar flexible material.

The driving pulley 22 is operatively connected to a suitable power source (not shown) whereby the pulley 22 may be driven at the desired speed. This driving arrangement for the pulley 22 may take any conventional arrangement and does not form a part of the present invention. In its bottom run or return passage, the conveyor belt 20 is flat and runs over a number of guide rollers 23, 23, mounted in the frame of the apparatus. The idler pulley 21 is journaled at opposite ends in bearings 24, carried on a frame 25 provided with rollers 26 which run upon the tracks 27. The desired tension is put on the conveyor belt 20 by means of a weight 28 connected to the frame 25 by a cable 29 running over the guide pulleys 30 and 31. The tension on the belt 20 may be adjusted by adding or removing increments to the weight 28.

The conveyor belt 20 is in flattened condition as it leaves the top of the idler pulley 21. As the belt 20 enters the U-shaped trough 16, it runs under a wooden guide pulley 32 mounted at the entrance 17 to the trough 16. The bottom of the guide wheel 32 is elevated above the bottom of the trough 16 a distance slightly in excess of the thickness of the belt 20 so that the belt 20 will not bind between the wheel 32 and the bottom of the trough 16.

As the conveyor belt 20 passes through the trough 16 under the hopper 15, it is loaded with pieces of filter cake falling through the elongated opening in the bottom of the hopper 15. The speed of the conveyor belt 20 is so regulated in relation to the rate of discharge filter cake from the filter 10, that the conveyor belt 20 receives the proper amount of filter cake to make up a continuous block of starch of the desired predetermined dimensions.

As shown in Figure 7, a vertically adjustable gate 34 is provided at the right hand end of the hopper 15 which serves to give a preliminary smoothing out or leveling off of the pieces of filter cake retained in the conveyor belt 20. The gate 34 is slidably mounted in two opposite guide members 35. The gate 34 is provided with a vertical slot 36 through which extends a clamping bolt having a wing nut 37. As shown in Figure 7, the gate 34 is in its uppermost position.

Following its passage under the hopper 15, the conveyor belt 20 next runs over a vibrator indicated generally at 40. The vibrator 40 has a platform 41 which supports the portion of the trough 16 which passes therethrough. Three electromagnetic vibrator units 42 are disposed underneath the platform 41 and are operatively connected therewith. The electric vibrators 42 serve to vibrate the platform 41 throughout its length at a frequency of approximately 1500 to 3600 vibrations per minute with an amplitude or throw up to a maximum of one-sixteenth of an inch. As the conveyor belt 20 passes over the vibrator 40, vibrations are imparted to it and its contents of starch filter cake. The vibrating action serves to puddle or coalesce the starch into a continuous block 44 (Figure 1b) which may be subsequently broken up and dried into crystal starch as more fully described below.

In order to buffer the vibrating action of vibrator 40, a belt 43 held down by an elongated articulated weight 47 (Figure 2) may be run over the top of the block of starch 44. The belt 43 passes under a pair of vertically adjustable guide pulleys 45 and 46 and the speed is synchronized with that of belt 20. The weight 47 is made up of a plurality of weight segments or units having eyes 48 projecting from opposite sides thereof with cables 50 strung through the eyes and tied at opposite ends to parts of the frame as shown.

Each of the pulleys 45 and 46 is carried in bearings which are adjustably supported on vertical screws. Thus, in Figure 6 of the drawing the pulley 45 is shown mounted in bearings 51 carried on brackets 52 supported on the vertical screws 53. Turning of the screws 53 serves to raise or lower the pulley 45 to the desired height. After the leveling belt 43 passes up around the pulley 45, it passes around a tightening pulley 54 and an upper guide pulley 55. The pulley 54 is journaled in bearings which are carried on a wheeled frame 56 which runs on a pair of tracks 57 (Figure 3). Tension is applied to the frame 56 by means of a cable 60 passing over guide pulleys 61 and 62. A weight 63 (Figure 2) is attached to the free end of the cable 60 so as to give the desired tension.

As the leveling belt 43 passes over the top surface of the continuous block of starch 44, it presses down on the block under the influence of the articulated weight 47 so as to smooth off the top surface and assist in conforming the block to the desired final dimensions. Ordinarily, the continuous block of starch 44 forms satisfactorily without the use of the leveling belt 43, and the leveling belt 43 and the associated equipment are not used. When the moisture content of the starch filter cake is at or below the minimal value, then the leveling belt 43 is employed.

Although the vibration treatment imparted by the vibrator 40 helps to form the starch block 44 into its proper form and dimensions, it has the further function of causing the starch to coalesce or puddle so that it may be subsequently dried into crystal starch. Shaping of the starch into the continuous block 44, without the vibration treatment, does not of itself provide a product which can be satisfactorily dried into crystal starch.

After the conveyor belt 20 and the block of starch 44 contained therein emerge from the outwardly flared end 18 of the trough 16, arrangement is made to strip the conveyor belt from the opposite sides of the starch block 44 and then to flatten out the conveyor belt. A pair of stripper plates 65 (Figures 1a and 5) are located to the rear of the trough opening 18 and are so positioned as to fit in between the sides of the conveyor belt 20 and the sides of the block of starch 44, as shown in Figure 5. After the conveyor belt 20 passes the strippers 65, it begins to flatten out, and the flattening is completed when the belt passes under the flattening plates 66, as shown in Figure 1b and Figure 5.

To the rear of the belt flattening plate 66, a scoring or cutting device 67 is provided, as shown in Figure 1b. As shown in greater detail in Figure 8, the cutter device 67 comprises a pair of knives 68 having vertical cutting edges 70. The knives 68 are aligned in the same vertical plane. The knives 68 are mounted for reciprocatory movement on the guide posts 71 and each knife 68 is connected to the piston of an associated air cylinder 72 by means of a piston rod 73. Operation of the cylinders 72 is so coordinated that they operate together to force the knives 68 into the block of starch 44 from opposite sides. It has been found that satisfactory cutting or scoring of the block of starch 44 is obtained if the knife edge 70 comes to within one and one-half to two inches of meeting on their cutting stroke. The frequency of operation of the cutter 67 is determined by the length of the pieces into which it is desired to cut the block of starch 44, taking into consideration the speed of belt 20. Blocks or pieces of starch having a length of seven or eight inches have been found to be satisfactory.

After passing by the cutter 67, the blocks of starch 74 (Figure 1b), are separated from each other and are removed from the conveyor belt 20. Thereafter, these blocks 74 are transferred to a kiln and dried into crystal starch.

The following design data and typical operating data apply to the embodiment of the invention described in detail above in connection with the apparatus shown in the accompanying drawings:

Distance between centers of pulleys 21 and 22—about 72 feet.
Width of conveyor belt—28 inches.
Speed of conveyor belt (may vary from 3 to 20 feet per minute)—about 9 feet per minute.
Height and width of trough 16—13 inches (overall) x 7½ inches (inside).
Length of hopper 15—11 feet.

Length of vibrator platform 41—13 feet.
Speed of leveling belt 43—same as conveyor belt.
Width and height of block of starch 44—7 x 7 to 8 inches.
Length of blocks of starch 74—7 inches.

It will be seen from the foregoing description that the present invention embodies distinct improvements over prior methods of producing crystal starch. Thus, the time required to produce blocks of starch from a slurry of corn starch is reduced from about 8 to 16 hours, to about 11 minutes. The amount of floor space required to make blocks of starch is reduced considerably, and a considerable amount of hand labor is eliminated. Further, there is no loss of starch in the operation while in the method employing drip boxes, a considerable amount of starch is lost during the "tipping" operation. Also, the danger of fermentation and mold growth is eliminated.

It will be understood that the nature of this invention permits a number of modifications to be made in respect to the process and apparatus for carrying out the same, and it is intended to include all of such modifications within the broad scope of the invention. Accordingly, it is intended that all matter described above or shown in connection with the accompanying drawings is to be interpreted as illustrative of the invention and is not to be construed in a limited sense.

We claim:

1. In the production of crystal starch from starch slurry, the improvement which comprises, filtering the starch slurry to form a filter cake having a moisture content of about 42 to about 55 percent, forming the filter cake into a continuous, moving elongated mass, and vibrating at least a portion of the length of said moving mass thereby forming it into a continuous block of starch having a predetermined uniform cross-section from which crystal starch may be formed by drying.

2. In the production of crystal starch from starch slurry having a density not in excess of about 25° Baumé, the improvement which comprises, filtering said starch slurry on a continuous filter to form a continuous supply of starch filter cake having a moisture content within the range of about 42 to about 55 percent and a temperature within the range of about 70° F. to about 110° F., breaking said filter cake into pieces, spreading said pieces of filter cake into an endless moving form and vibrating a portion of said moving form at a frequency with the range of 1500 to 3600 vibrations per minute with an amplitude up to about one-sixteenth of an inch thereby completing the formation of a continuous moving block of starch from which crystal starch may be formed by drying.

3. In the production of crystal starch from starch filter cake, the improvement which comprises, forming starch filter cake having a moisture content of about 42 to about 55 percent into a continuous, moving elongated mass, and vibrating at least a portion of the length of said moving mass thereby forming it into a continuous block of starch having a predetermined uniform cross-section from which crystal starch may be formed by drying.

4. In the production of crystal starch from a slurry of corn starch, the improvement which comprises, filtering the starch slurry to form a filter cake having a moisture content of about 44 to about 47 percent, forming the filter cake into a continuous, moving elongated mass, and vibrating at least a portion of the length of said moving mass thereby forming it into a continuous block of starch having a predetermined uniform cross-section from which crystal starch may be formed by drying.

5. In the production of crystal starch from a slurry of sorghum starch, the improvement which comprises, filtering the starch slurry to form a filter cake having a moisture content of about 44 to about 47 percent, forming the filter cake into a continuous, moving elongated mass, and vibrating at least a portion of the length of said moving mass thereby forming it into a continuous block of starch having a predetermined uniform cross-section from which crystal starch may be formed by drying.

6. In the production of crystal starch from a slurry of tapioca starch, the improvement which comprises, filtering the starch slurry to form a filter cake having a moisture content of about 45 to about 52 percent, forming the filter cake into a continuous, moving elongated mass, and vibrating at least a portion of the length of said moving mass thereby forming it into a continuous block of starch having a predetermined uniform cross-section from which crystal starch may be formed by drying.

7. Apparatus for continuously forming starch slurry into a continuous elongated block of starch of predetermined uniform cross-section from which crystal starch may be formed by drying, which comprises, in combination, a continuous type of filter adapted to continuously produce from starch slurry a supply of starch filter cake having a moisture content within the range of about 42 to about 55 percent, a hopper having an elongated outlet opening disposed to receive pieces of filter cake discharged from said filter, an endless flexible conveyor belt having an upper run and a lower run, a driving pulley at one end of said belt and an idler pulley at the opposite end, driving means operatively interconnected with said driving pulley, said driving and idler pulleys being so disposed that a portion of the upper run of said belt passes beneath the discharge opening of said hopper, a rigid trough of U-shaped cross-section disposed in the path of said upper run of said belt and having at least a portion of its length disposed beneath and aligned with the discharge opening of said hopper, said trough serving to impart a corresponding U-shaped cross-section to said belt as it passes therethrough, and a vibrator operatively interconnected with a portion of said trough beyond said hopper for imparting vibration thereto and to the portion of said conforming belt passing therethrough.

8. The apparatus called for in claim 7 wherein said filter is of the rotary drum type having a string discharge for removing the filter cake.

9. The apparatus called for in claim 7 including additionally smoothing and leveling means for said continuous elongated block of starch which comprises, a pair of pulleys one of which is mounted over said conveyor belt adjacent the front end of said vibrator and the other of which is mounted over said conveyor belt adjacent the rear end of said vibrator, a leveling belt passing over said pulleys, driving means operatively connected with one of said pulleys for driving the same so that the lower run of said leveling belt travels in a direction opposite to that of the top run of said conveyor belt, and an elongated articulated weight supported at opposite ends adjacent to said pulleys and resting on said lower run of said leveling belt so as to force the latter to engage the top surface of said continuous elongated block of starch.

10. Apparatus for continuously converting starch slurry into a continuous elongated block of starch from which crystal starch may be formed by drying, which comprises, in combination, a continuous type of filter adapted to continuously produce a supply of starch filter cake from starch slurry, a conveyor including an endless flexible belt disposed adjacent said filter for receiving the continuous supply of starch filter cake therefrom, a trough through which the upper run of said conveyor belt passes and wherein it conforms to the shape of said trough, and a vibrator operatively interconnected to at least a portion of said trough so as to impart vibration thereto and the portion of said conveyor belt passing therethrough.

11. In combination with a conveyor for a continuous block of material of plastic consistency wherein the upper run of an endless conveyor belt passes through a U-shaped trough and assumes a U-shaped cross-section conforming to the interior of said trough, means for separating said belt from the sides of a continuous block of said material formed in said trough which comprises, a pair of spaced apart, parallel, depending stripper plates mounted adjacent the outlet of said trough, said stripper plates fitting in between the opposite sides of said continuous block and the sides of said U-shaped conveyor belt, and a pair of spaced apart belt leveling plates disposed back of said stripper plates in the direction of movement of said conveyor belt, said leveling plates extending toward each other in a horizontal plane.

12. In the production of crystal starch from starch slurry, the improvement which comprises, filtering the starch slurry to form a filter cake having a moisture content of about 42 to about 50 percent, forming the filter cake into a continuous, moving elongated mass, and vibrating at least a portion of the length of said moving mass thereby forming it into a continuous block of starch having a predetermined uniform cross-section from which crystal starch may be formed by drying.

13. In the production of crystal starch from a slurry of potato starch, the improvement which comprises, filtering the starch slurry to form a filter cake having a moisture content of about 48 to about 53 per cent, forming the filter cake into a continuous, moving elongated mass, and vibrating at least a portion of the length of said moving mass thereby forming it into a continuous block of starch having a predetermined uniform cross-section from which crystal starch may be formed by drying.

14. In the production of crystal starch from a slurry of rice starch, the improvement which comprises, filtering the starch slurry to form a filter cake having a moisture content of about 50 to about 55 per cent, forming the filter cake into a continuous, moving elongated mass, and vibrating at least a portion of the length of said moving mass thereby forming it into a continuous block of starch having a predetermined uniform cross-section from which crystal starch may be formed by drying.

ALF MARSHALL KRATTEBOL.
ALFRED COOKE.

REFERENCES CITED

The following references are of record in the file of this patent:

UNITED STATES PATENTS

| Number | Name | Date |
| --- | --- | --- |
| 254,158 | Roat | Feb. 28, 1882 |
| 450,492 | Ostenberg | Apr. 14, 1891 |
| 1,260,983 | Lenders | Mar. 26, 1918 |
| 1,947,029 | Allison | Feb. 13, 1934 |
| 2,234,953 | Belcher et al. | Mar. 18, 1941 |
| 2,327,943 | Tiers | Aug. 24, 1943 |